(12) United States Patent
Kusaka

(10) Patent No.: US 7,609,048 B2
(45) Date of Patent: Oct. 27, 2009

(54) PROBE MICROSCOPE AND MEASURING METHOD USING PROBE MICROSCOPE

(75) Inventor: Takao Kusaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 11/797,116

(22) Filed: May 1, 2007

(65) Prior Publication Data

US 2007/0285078 A1 Dec. 13, 2007

(30) Foreign Application Priority Data

May 9, 2006 (JP) .............................. 2006-129859

(51) Int. Cl.
*G01R 31/02* (2006.01)
(52) U.S. Cl. ...................... 324/72.5; 324/754; 250/306; 250/309; 850/33; 850/58
(58) Field of Classification Search ................. 324/72.5
See application file for complete search history.

(56) References Cited

U.S. PATENT DOCUMENTS

| 7,282,710 | B1* | 10/2007 | Black et al. | .................. | 250/306 |
| 2004/0051542 | A1* | 3/2004 | Miles et al. | .................. | 324/754 |
| 2005/0269510 | A1* | 12/2005 | Chang | ........................ | 250/309 |
| 2007/0018504 | A1* | 1/2007 | Wiener et al. | ............... | 307/108 |
| 2007/0024295 | A1* | 2/2007 | Humphris et al. | ........... | 324/754 |

FOREIGN PATENT DOCUMENTS

| JP | 7-66250 | 3/1995 |
| JP | 2000-28625 | 1/2000 |
| JP | 2000-329680 | 11/2000 |

OTHER PUBLICATIONS

C.B. Duke, "Polymers as electronic materials", J. Vac. Sci. Technol. A 3(3), May/Jun. 1985, pp. 732-738.
T.J. Fabish, et al., "Molecular charge states and contact charge exchange in polymers", Journal of Applied Physics, vol. 48, No. 10, Oct. 1977, pp. 4256-4266.

* cited by examiner

*Primary Examiner*—Timothy J Dole
*Assistant Examiner*—Benjamin M Baldridge
(74) *Attorney, Agent, or Firm*—Fitzpatrick, Cella, Harper & Scinto

(57) ABSTRACT

Provided is a probe microscope for measuring a surface potential of a sample, including a contact electrification mechanism (circuit (C)) for bringing an electroconductive probe device into contact with a surface of the sample and applying a voltage in the contact state to induce electrification on the surface of the sample, and a potential measuring mechanism (circuit (K)) for measuring the surface potential of the sample caused by the contact electrification mechanism in a non-contact state of the electroconductive probe device and the surface of the sample, wherein the electrification induced by the contact electrification mechanism and the measurement of the surface potential by the potential measuring mechanism alternate in time series while the voltage applied during the contact is gradually changed, thereby measuring a correlation between the applied voltage and the surface potential.

3 Claims, 7 Drawing Sheets

PROBE MICROSCOPE AND MEASURING METHOD USING PROBE MICROSCOPE

BACKGROUND OF THE INVENTION

1. Field of the Invention

The present invention relates to a probe microscope and a measuring method using the probe microscope, more particularly, to a probe microscope capable of measuring an electronic state density of a surface of a high-resistance material, and a measuring method using the probe microscope.

2. Description of the Related Art

In recent years, a significant increase in performance of an electronic device represented by a silicon device and a reduction in size of the structure thereof have been realized, and an electronic device has been developed to achieve a structure size in an order of nanoscale.

Not only an inorganic material but also an organic material and a polymer material are incorporated into the device as constituent materials.

When the device becomes a nanoscale size, it is necessary to use a method of locally evaluating electronic characteristics of a portion which exerts a predetermined function in the order of nanoscale. A method using contact electrification with metal has been reported as a method of measuring an electronic state density of a high-resistance material such as a polymer material in "Molecular charge states and contact charge exchange in polymers" Thomas J. Fabish and Charles B. Duke, et al., J. Appl. Phys. 48 (1977), 4256 and "Polymers as electronic materials" by C. B. Duke, J. Vac. Sci. Tecnol., 3(1985), 732.

This method is a method of bringing several kinds of metals such as Ni, Pb, Au, In, Sn, and Pt into contact with a polymer film to measure a change of a surface potential and estimating the electronic state density of the polymer material based on a result obtained by the measurement.

Up to now, an evaluation method using a combination of an X-ray photoelectron spectroscopy (XPS) or an ultraviolet photoelectron spectroscopy (UPS) and an inverse photoelectron spectroscopy (IPES) has been known as a method of measuring an electronic state of the surface of a sample.

For example, when an electronic structure of mainly a (vapor-deposited) thin film made of an organic compound, a metal complex, or a polymer, an electronic structure of the surface thereof, or an electronic structure of a boundary thereof is to be measured, a valence state is observed using an ultraviolet photoelectron spectroscopy and an electron-free state is observed using an inverse photoelectron spectroscopy.

According to a combination of these measuring methods, electronic structures above and below an energy gap which control development of electronic properties can be directly picked up.

A measuring method using a scanning tunneling microscope (STM) or a scanning tunneling spectroscopy (STS) has been known as a method of measuring a local electronic state of a sample in the order of nanoscale.

The STM can control a height of a probe so as to make a tunnel current flowing between the probe and the sample constant, thereby obtaining shape information of the sample and height information thereof. According to the STS, a physical material property can be determined based on variations in voltage applied to a probe and tunnel current value.

There has been known an atomic force microscope (AFM) which is classified as a scanning probe microscope in addition to the STM, for controlling a height of a probe so as to make an intermolecular force acting between the probe and a sample constant, thereby obtaining shape information of the sample and height information thereof.

The intermolecular force used for detection in the AFM is a van der Waals force. This force is a force acting between electric dipoles induced in the probe and the sample and is not significantly changed depending on a material structure in many cases. Therefore, a material surface shape can be suitably measured.

There has been known a measuring method of measuring a current and a voltage using an electroconductive cantilever while measurement is performed by a contact mode atomic force microscope (AFM).

Examples of a force serving as the intermolecular force include not only the van der Waals force and a Coulomb force but also a charge transfer force.

The charge transfer force is a bonding force between molecules which is caused by the partial transport of electrons from an electron donor to an electron acceptor.

The charge transfer force is significantly changed between a material which causes the transport of electrons and a material which does not cause the transport of electrons.

Therefore, it is expected that surface physical properties of various substances can be recognized by accurately measuring the charge transfer force on the sample.

In view of the above, a method of measuring the charge transfer force based on a force curve of the contact mode AFM has been proposed as the method of measuring the electronic state even on the surface of a mixture of a metal and an insulator in Japanese Patent Application Laid-Open No. 2000-028625.

A method of evaluating properties of an insulating film on a semiconductor surface using a probe microscope has been proposed in Japanese Patent Application Laid-Open No. H07-066250.

This method is an evaluating method capable of measuring dielectric breakdown properties of a minute region of a thin film on the semiconductor surface. In the method, an electroconductive probe device is brought into contact with the thin film on the semiconductor surface, and then a temporal variation in the amount of contact electrification amount is measured using the atomic force microscope.

Further, a Kelvin probe force microscope using a non-contact atomic force microscope, for measuring a surface potential of a sample has been known.

In the Kelvin probe force microscope, a contact potential difference caused by a difference between a work function of a probe device and a work function of the sample is detected by the non-contact atomic force microscope.

According to the Kelvin probe force microscope, when a voltage in which a direct current component and an alternating current component (angular frequency $\omega$) are superimposed on each other is applied between the probe device and the sample, the direct current component of the applied voltage is feedback controlled such that an amplitude of an $\omega$ component of an electrostatic force acting on the probe device becomes zero, whereby the contact potential difference can be detected.

In other words, while the feedback control is performed, a relative in-plane positional relationship between the probe device and the sample is checked by scanning. Therefore, a two-dimensional distribution on the surface of the sample can be obtained.

A method of measuring a surface shape of the sample and a surface potential thereof based on the principle of the Kelvin probe force microscope has been proposed in Japanese Patent Application Laid-Open No. 2000-329680.

According to the method, when unevenness of the surface of the sample is to be measured, an alternating signal for vibrating a probe and an alternating voltage signal for measuring the surface potential information of the sample are simultaneously applied. When the surface potential information of the sample is to be measured, only the alternating voltage signal for measuring the surface potential information is applied.

Therefore, a frequency component unnecessary at the time of measuring the surface potential information of the sample is suppressed to improve an S/N ratio of the surface potential information of the sample to be measured.

As described above, the various methods for measuring the electronic state density of the surface of high-resistance materials such as a polymer material or an organic material have been proposed up to now.

However, the number of methods which are practically used or widely used is small. Many methods can be applied to only a few materials, or require complicated measurement and take a very long time. According to the method described in J. Appl. Phys. 48 (1977), 4256 or J. Vac. Sci. Tecnol., 3(1985), 732, it is necessary to prepare a plurality of metal materials having different work functions, measurement is complicated, and energy resolution of data does not become constant. According to the above-mentioned evaluation method using the combination of the X-ray photoelectron spectroscopy (XPS) or the ultraviolet photoelectron spectroscopy (UPS) and the inverse photoelectron spectroscopy (IPES), it is necessary to measure the sample in a high-vacuum environment, and the sample is likely to be damaged or charged up. In particular, the charge up causes dulling of a spectral shape or a peak shift, thereby significantly reducing reliability of data.

In order to prevent such a phenomenon from occurring, for example, measures for reducing an intensity of excitation light are required. However, even when the measures are employed, a measurable film thickness of an organic material is up to several tens of nm.

Therefore, not an actual sample but a model sample is made and evaluated in many cases. For example, an extremely thin film is formed on a metal.

The measuring method using the scanning tunneling microscope (STM) or the scanning tunneling spectroscopy (STS) requires feedback of a tunnel current flowing between the probe and the sample, so that only an electroconductive sample can be measured.

Therefore, the sample is limited to a metal, graphite, a semiconductor having a resistance value of several Ω or less, or an extremely thin film formed on a metal.

In addition, because a device structure itself contains a metal and an insulator, it is difficult to measure a local electronic state of the sample to be measured by the existing STM/STS.

The method of obtaining the shape information of the sample and the height information thereof using the atomic force microscope (AFM) is suitable for measuring a material surface shape. However, in order to distinguish materials having different structures from one another or to measure a local electronic state, it is necessary to use a probe having a special function.

In the case of the method of measuring a current and a voltage using the electroconductive cantilever while performing measurement by the contact mode atomic force microscope (AFM), the probe is always in contact with the sample.

Therefore, the electronic state of the sample cannot be measured, so that a transport phenomenon of the entire system which includes a contact characteristic between the probe and the sample to be measured is evaluated.

In the case of measurement using the contact mode AFM, a material with weak attachment to a substrate, such as a carbon nanotube or DNA is pushed away by the probe during measurement, whereby an object type to be measured is limited.

The measuring method described in Japanese Patent Application Laid-Open No. 2000-028625 requires that each focus curve be analyzed for each measurement point to perform evaluation.

Therefore, this measurement takes a very long time and it is difficult to measure an electronic state of a sample fixed at a certain point in the order of nanoscale or to form an image of a result obtained by the measurement. According to the evaluation method described in Japanese Patent Application Laid-Open No. H07-066250, only a dissipation process of injected charges into the semiconductor is measured, and thus, the electronic state of a high-resistance material cannot be measured.

The measuring method using the Kelvin probe force microscope which is described in Japanese Patent Application Laid-Open No. 2000-329680 is intended to improve the S/N ratio of the measured surface potential information when the surface potential information of the sample is detected, and attention is not paid to the accurate measurement of the electronic state density of the surface of the high-resistance material.

In particular, a method of accurately measuring information of a local site and a distribution thereof has been demanded along with extremely in a device. However, a way to realize the method is not taken into account.

SUMMARY OF THE INVENTION

The present invention has been made in view of the above-mentioned problems. An object of the present invention is to provide a probe microscope capable of accurately measuring an electronic state density of a surface of a high-resistance material, and a measuring method using the probe microscope.

Another object of the present invention is to provide a probe microscope capable of locally measuring the electronic state density and visualizing a distribution of the measured electronic state density, and a measuring method using the probe microscope.

In order to solve the problems, according to the present invention, there are provided a probe microscope having the following structure and a measuring method using the probe microscope.

That is, there is provided a probe microscope including: an electroconductive probe device; a contact electrification mechanism for bringing the electroconductive probe device into contact with the surface of a sample and applying a voltage between the electroconductive probe device and the sample to induce electrification on the surface of the sample; and a potential measuring mechanism for bringing the electroconductive probe device close to the surface of the sample in a non-contact state to measure the surface potential of the sample, wherein the electrification of the surface of the sample induced by the contact electrification mechanism and the measurement of the surface potential by the potential measuring mechanism alternate in time series while the voltage applied at the time of the contact is gradually changed to measure a correlation between the voltage applied at the time of the contact and the surface potential.

There is also provided a method of measuring the surface potential of a sample by a probe microscope, including: bringing an electroconductive probe device into contact with the surface of the sample and applying a voltage between the electroconductive probe device and the sample to induce electrification on the surface of the sample; and bringing the electroconductive probe device close to the surface of the sample to measure the surface potential of the sample, wherein while the voltage applied at the time of the contact is gradually changed, the induction of the electrification on the surface of the sample and the measurement of the surface potential of the sample alternate in time series to measure a correlation between the voltage applied at the time of the contact and the surface potential.

According to the present invention, the electronic state density of the surface of the high-resistance material can be accurately measured. According to the present invention, the local measurement of the electronic state density of the surface of the high-resistance material which was conventionally difficult can be performed.

According to the present invention, a local distribution of the electronic state density can be visualized by a scanning mechanism.

Further features of the present invention will become apparent from the following description of exemplary embodiments with reference to the attached drawings.

DESCRIPTION OF THE EMBODIMENTS

Figure 1A:
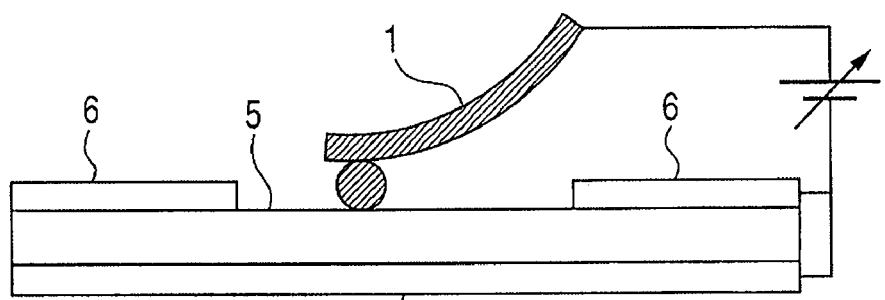
FIGS. 1A and 1B are explanatory views illustrating the operational procedure of a probe microscope according to an embodiment of the present invention.

According to the above-described structure, the objects of the present invention can be achieved. This is based on the fact that the following novel structure capable of accurately measuring an electronic state density of a high-resistance material surface is found as a result of concentrated studies made by the inventors of the present invention.

That is, the present invention relates to a probe microscope in which a voltage is applied in a state of bringing an electroconductive probe device into contact with a sample, to induce electrification on the surface of the sample and a surface potential caused by the electrification is measured by a non-contact Kelvin probe force microscope. To be specific, the induction of the electrification which is caused by the contact electrification mechanism and the measurement of the surface potential which is performed by the potential measuring mechanism are repeatedly switched in time series by a switching mechanism, so that a correlation between the applied voltage and the surface potential can be measured.

Therefore, the electronic state density at a local position of the sample is accurately measured.

According to the present invention, when the above-mentioned structure is employed, the electronic state density of the high-resistance material surface can be measured in nanometer scale and an image of the electronic state density can be formed. In the embodiment according to the present invention, the electroconductive probe device used for the probe microscope can be more specifically constructed as follows.

That is, the probe device for inducing the electrification and measuring the surface potential of the sample which is caused by the induction of the electrification can be constructed as follows.

The probe device can include a cantilever which is an elastic member, and a probe located at a tip portion which is a free end of the cantilever.

Here, a structure can be employed in which a tip curvature radius r of the probe is set so as to satisfy 15 nm$\leq$r$\leq$100 µm and the surface of the probe and the surface of the cantilever are coated with an electroconductive material.

When the tip curvature radius r of the probe is too small, the amount of contact electrification reduces. When the tip curvature radius r is too large, an electrification area increases and the spatial resolution of electrification measurement reduces. Therefore, although it is necessary to suitably select the tip curvature radius r based on a measurement condition, the tip curvature radius r is more desirably set so as to satisfy 50 nm$\leq$r$\leq$20 µm.

Thus, a structure of the probe device can be employed in which a spherical member having the tip curvature radius is fixed to the cantilever serving as the elastic member through an adhesive and then they are coated with the electroconductive material.

The electroconductive material can be selected from a metal, an intermetallic compound thereof, and a semiconductor oxide. In view of stability, Au or Pt is desirable.

When distribution measurement is to be performed, a commercially available metal-coated electroconductive probe device is desirably used in order to place a priority on the spatial resolution.

The probe microscope according to this embodiment can be constructed to be arbitrarily apply an alternating current voltage and a direct current voltage between the probe device and the surface of the sample. For example, when the electrification is to be induced, a direct current voltage is applied between the probe and the surface of the sample and the applied voltage is swept at each measurement cycle. When the surface potential is to be measured, a voltage in which an alternating current voltage and a direct current voltage are superimposed on each other is applied and the direct current voltage is adjusted such that an electrostatic force caused between the probe device and the sample becomes minimum.

The probe microscope according to this embodiment can be constructed to bring the probe device into contact with the surface of the sample by an arbitrary force or excite the probe at an arbitrary frequency.

At the time of induction of a contact potential, the tip portion of the probe is brought into contact with the surface of the sample at an arbitrary set value. At this time, a contact pressure is set by a laser displacement detecting mechanism of an AFM. Although the force depends on a measurement environment, a force of approximately 1 nN to 50 nN is desirable.

When the surface potential is to be measured, a structure can be employed in which the probe device is longitudinally excited by a piezoelectric element attached to a rear surface of the probe device. A distance between the probe and the sample and the surface potential are measured based on changes in frequency and amplitude thereof.

The probe microscope according to this embodiment can include a mechanism capable of performing surface potential measurement based on a frequency shift detecting method using the probe device, that is, a mechanism capable of performing measurement using an FM-controlled Kelvin probe force microscope.

In this case, the probe microscope is constructed such that the measurement can be performed by the Kelvin probe force microscope in a state in which the used probe device is separated from the surface of the sample at a predetermined distance.

Here, when a structure based on the frequency shift detecting method is employed, a potential can be measured in a non-contact manner while the distance between the probe and the sample is controlled. Therefore, an accurate value can be obtained without the influence of electrification dissipation.

Alternatively, when a structure based on an amplitude modulation detection method is employed, the potential can be measured by setting the amount of lift up after contact electrification.

In the case of the amplitude modulation detection method, the distance between the probe and the sample is not feedback controlled. Therefore, when there is a drift in a scanner, it is likely to cause an error in the potential measurement. However, there is a merit that a measuring circuit can be simplified.

According to the probe microscope in this embodiment as described above, the voltage is applied in a state in which the electroconductive probe device is brought into contact with the sample, thereby inducing the electrification on the surface of the sample. Therefore, the surface potential of the sample which is caused by the electrification can be measured by the non-contact Kelvin probe force microscope. Thus, when a correlation between the applied voltage and the surface potential is obtained, the electronic state density at a local position of the sample can be accurately measured.

When scanning with the electroconductive probe device is performed, different materials in the surface of the sample can be locally distinguished from one another based on a surface potential difference.

When scanning with the electroconductive probe device is performed, the measurement can be continuously performed while a position on the surface of the sample is shifted, to display an image of a distribution obtained by the measurement.

In the measurement, the electronic state density (relationship between the applied voltage and the surface potential) is obtained at each position. Therefore, measurement data is expressed by "(position information)×(applied voltage)× (surface potential)".

Therefore, the displayed distribution is a surface potential distribution obtained at an arbitrary contact voltage. When a specific position is set, an electronic state density distribution graph (relationship between the contact voltage and the surface potential) obtained at the position can be displayed.

Hereinafter, the embodiment of the present invention will be more specifically described with reference to the attached drawings. The present invention is not limited to the embodiment.

Figure 1B:
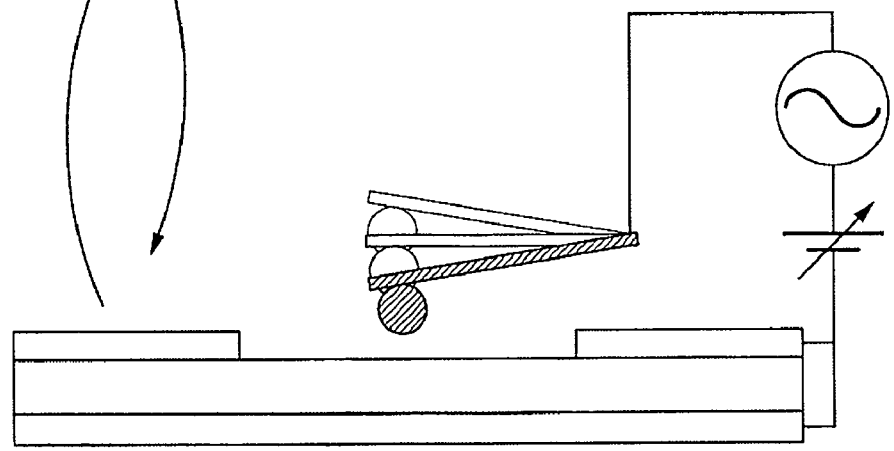
Figure 2:
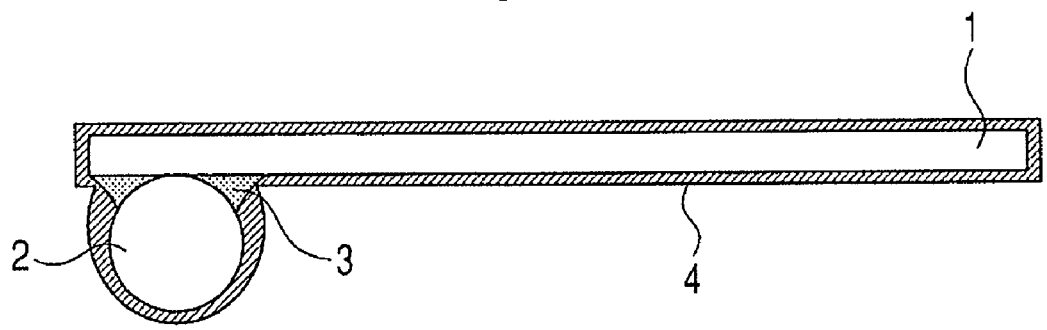
FIG. 2 is a structural view illustrating an example of a probe device used for the probe microscope according to the embodiment of the present invention.

FIGS. 1A and 1B are explanatory views illustrating an operational procedure of the probe microscope according to this embodiment. FIG. 2 is a structural view illustrating an example of a probe device used for the probe microscope according to this embodiment as illustrated in FIGS. 1A and 1B.

The probe device used for the probe microscope according to this embodiment will be described with reference to FIG. 2.

In FIG. 2, the probe device includes a cantilever 1 serving as an elastic member, a fine particle 2, an adhesive 3, and an electroconductive coating film 4.

The cantilever 1 has one selected from various hardnesses. When measurement is to be performed using the Kelvin probe force microscope, it is desirable to use a cantilever whose spring constant is approximately 1 N/m to 6 N/m (resonance frequency is 60 kHz to 100 kHz).

The probe 2 located in a free end of the cantilever 1 serving as the elastic member has the curvature radius r set so as to satisfy $15\ nm \leq r \leq 100\ \mu m$. When the curvature radius r is too small, the amount of contact electrification reduces. When the curvature radius r is too large, the electrification area increases and the spatial resolution of electrification measurement reduces. Therefore, it is desirable to use, as the probe, a fine particle having a radius r set so as to satisfy $50\ nm \leq r \leq 20\ \mu m$.

Examples of the adhesive 3 which can be used include an epoxy and a wood glue.

A material of the electroconductive coating film 4 for applying a potential to the probe device can be selected from metal such as Au, Ag, Pt, Pd, Zn, Cr, W, or In, an intermetallic compound thereof, and a semiconductor oxide. In view of stability, Au or Pt is desirable.

When the distribution measurement is to be performed, a commercial metal-coated electroconductive probe device whose tip curvature radius is approximately 40 nm to 50 nm can be used in order to place a priority on the spatial resolution.

The operational procedure of the probe microscope according to this embodiment will be described with reference to FIGS. 1A and 1B. In FIGS. 1A and 1B, a high-resistance material 5 is used as the sample. The fine particle is bonded to the cantilever 1 and then electroconductive coating is performed on the cantilever 1.

Because the sample is the high-resistance material, in order to stabilize a surface potential thereof, a toroidal metal evaporation film 6 is more desirably formed on the surface of the sample to perform measurement in an inner region of the metal evaporation film 6. The metal evaporation film 6 desirably has an inside diameter equal to or smaller than 1 mm and a thickness of approximately 100 nm.

FIG. 1A illustrates a state in which contact electrification is induced and FIG. 1B illustrates a state in which a electrification potential is measured.

In the measurement, first, the tip end of the probe device is brought into contact with the surface of the sample at an arbitrary set value. Although a contact pressure depends on a measurement environment, a force of approximately 1 nN to 50 nN is desirable.

At this time, a predetermined direct current voltage is applied between the probe device and the sample to move charges.

After that, the probe device is separated from the surface of the sample. Then, a surface potential is measured using the Kelvin probe force microscope while the probe device is held.

The surface potential is repeatedly measured while the direct current voltage related to electrification induction is sequentially changed, with the result that the electronic state density of the surface of the sample can be measured.

Figures 3A, 3B, 3C:
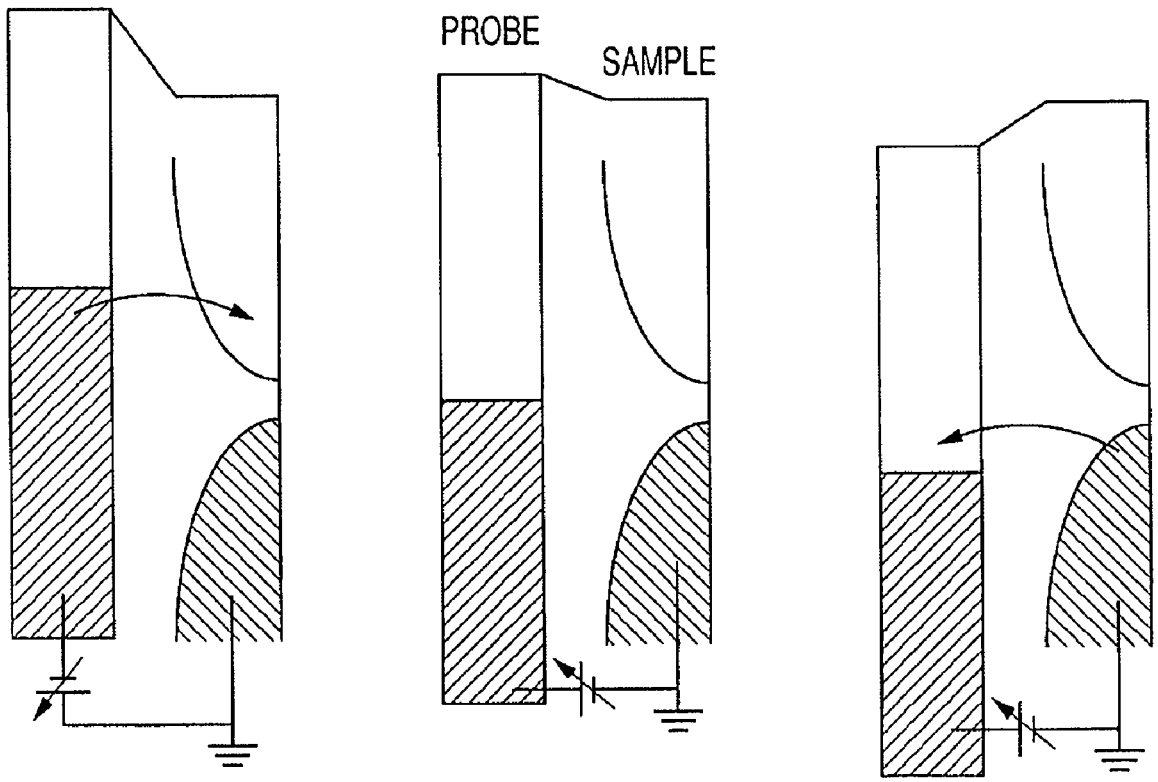
FIGS. 3A, 3B, and 3C are explanatory diagrams illustrating then operational principle of the probe microscope according to the embodiment of the present invention.

FIGS. 3A, 3B, and 3C are explanatory views illustrating an operational principle of a scanning probe microscope according to this embodiment.

When the probe device is in contact with the surface of the sample, an electron having an energy equal to a Fermi surface potential of the probe device moves by an amount corresponding to an electronic state density of the surface of the sample. When a Fermi energy level of a surface material of the probe device is higher than the electron-free state (conduction band state) of the sample, the electron moves from the probe device to the sample (FIG. 3A).

When the Fermi energy level of the surface material of the probe device is located in the gap region of the sample, the electron does not move (FIG. 3B).

When the Fermi energy level of the surface material of the probe device is lower than the electron occupied state of the sample, the electron moves from the sample to the probe device (FIG. 3C).

Because the sample is an insulator, a charge transferred to the surface of the sample (polarity is negative in a case where the electron moves from the probe device to the sample and polarity is positive in a case where the electron moves from the sample to the probe device) is locally stored at a corresponding position, thereby changing a surface potential at the position. Therefore, when the surface potential is measured, the amount of transferred charge is obtained. The amount of movement of the electron is proportional to the electronic state density of the electron having the energy equal to the Fermi surface potential of the probe device. When the electronic state density is large, the amount of movement also is large. In the gap region whose electronic state density is 0, the electron does not move. When the amount of movement of the electron is measured, the electronic state density of the sample can be determined.

A correlation between the applied voltage at the time of contact and the surface potential is measured. While the correlation is assumed as a correlation between the electron energy and the electronic state density of the surface of the sample, the electronic state density of the sample can be measured.

In other words, when the potential of the probe device is sequentially changed to measure the amount of electron moved by the contact as the potential, the electronic state density of the sample can be measured.

Figure 4:
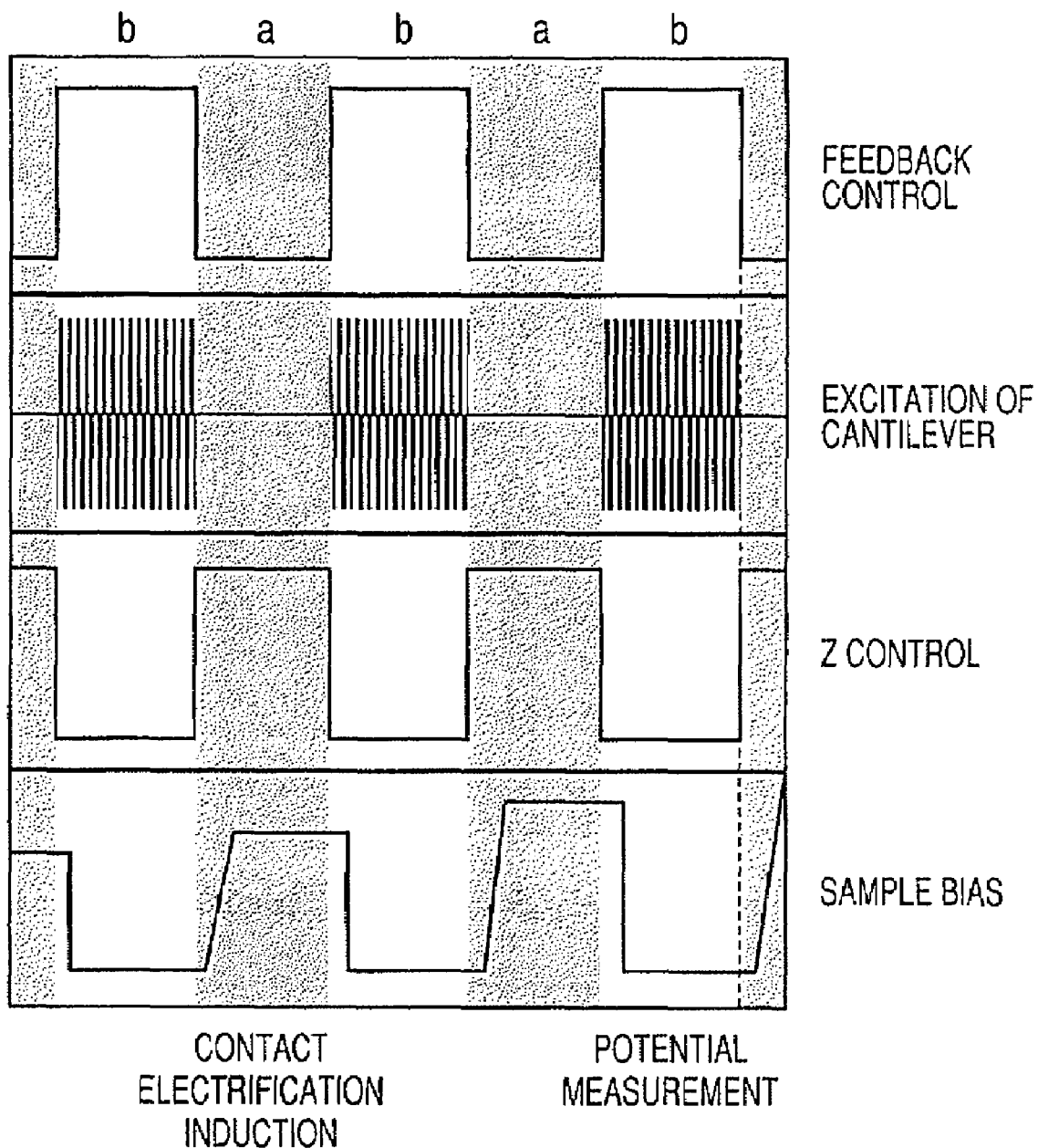
FIG. 4 is an explanatory diagram illustrating operating signals of circuits in the probe microscope according to the embodiment of the present invention.

FIG. 4 is an explanatory diagram illustrating operating signals of circuits in the probe microscope according to this embodiment.

A case where measurement is performed using the Kelvin probe force microscope based on a frequency shift detecting method will be described.

At a timing illustrated in (b) of FIG. 4, the probe device is excited and feedback control is enabled to control the distance between the probe device and the sample. Then, the potential is measured with a non-contact state.

After the measurement is completed, a control timing is shifted to a timing illustrated in (a) of FIG. 4. The excitation of the probe device is stopped and the feedback control is turned off. A Z-control system is controlled to bring the tip end of the probe device into contact with the surface of the sample at a predetermined contact pressure and a sample bias is applied. In this measurement, the probe device is grounded.

In order to prevent a discharge between the sample and the probe device, the sample bias is applied after the contact. Then, the sample bias is changed up to a predetermined voltage.

After that, the Z-control system is controlled to separate the tip end of the probe device from the surface of the sample and the control timing is shifted to the timing illustrated in (b) of FIG. 4. The excitation of the probe device and the feedback control are restarted. A surface potential caused by electrification induced at the timing illustrated in (a) of FIG. 4 is measured.

When each surface potential is measured while the sample bias applied at the timing illustrated in (a) of FIG. 4 is sequentially changed, the electronic state density of the surface of the sample can be obtained.

Figure 5:
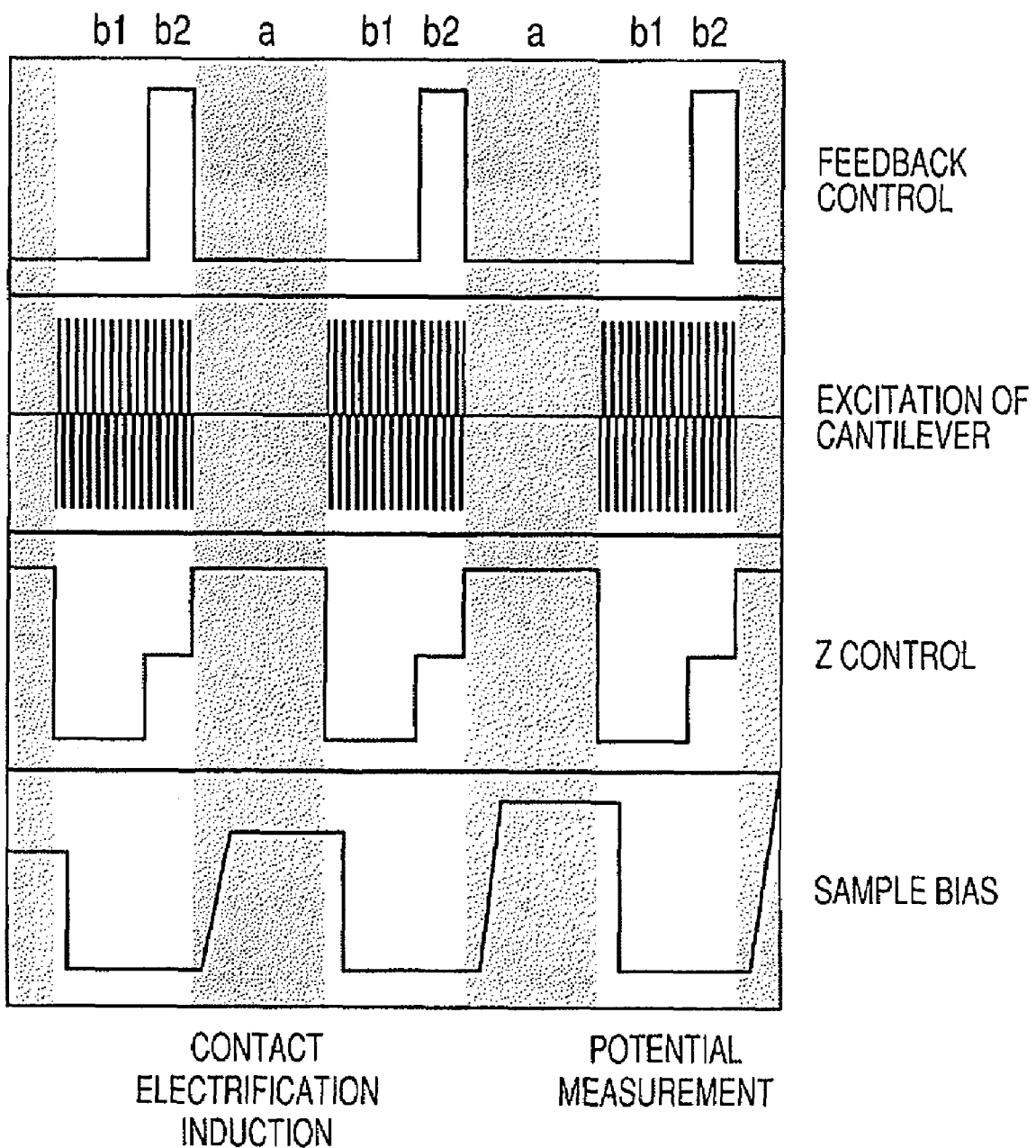
FIG. 5 is an explanatory diagram illustrating other operating signals of circuits in the probe microscope according to the embodiment of the present invention.

FIG. 5 is an explanatory diagram illustrating other operating signals of circuits in the probe microscope according to this embodiment.

Hereinafter, the case where the amplitude shift detecting method is used will be described.

At a timing illustrated in (b2) of FIG. 5, the probe device is excited and feedback control is enabled to control the distance between the probe device and the sample. A Z-position of a scanner at this time is stored.

After that, the excitation of the probe device is stopped and a control timing is shifted to a timing illustrated in (a) of FIG. 5 to turn off the feedback control. Then, the Z-control system is controlled to bring the tip end of the probe device into contact with the surface of the sample at a predetermined contact pressure and the sample bias is applied.

Also in this case, in order to prevent a discharge between the sample and the probe device, the sample bias is applied after the contact. Then, the sample bias is changed up to a predetermined voltage.

After that, the control timing is shifted to the timing illustrated in (b1) of FIG. 5. At this time, the amount of lift up is determined based on the Z-position stored at the timing illustrated in (b2) of FIG. 5 as described earlier such that the distance between the sample and the probe device becomes a predetermined distance. The Z-control system is controlled based on the amount of lift up.

With such a state, the excitation of the probe device is restarted and the surface potential of the sample is measured. After the completion of the measurement, the control timing is shifted to the timing illustrated in (b2) of FIG. 5 to measure a positional relationship between the sample and the probe device again. When each surface potential is measured while the sample bias applied at the timing illustrated in (a) of FIG. 5 is sequentially changed, the electronic state density of the surface of the sample can be obtained.

In this method, the distance between the probe and the sample is not feedback controlled at the time of potential measurement. Therefore, when there is a drift in a Z-scanner, an error may be generated in a measured potential value. However, unlike the case using the method as illustrated in FIG. 4, there is a merit that a measuring circuit can be simplified.

In the case where the probe microscope according to this embodiment is provided with a scanning function, when the electronic state density is measured while the position on the surface of the sample is changed, a distribution image thereof can be formed.

In such a case, the volume of the measurement data becomes a product of (position information), (applied voltage), and (surface potential). This is the same as that in current imaging tunneling spectroscopy (CITS) measurement using an STM.

The number of distribution images obtained in this case is equal to the number of voltages applied when a surface potential distribution is measured corresponding to a probe contact potential.

When a specific position on the distribution image is selected, an electronic state density (graph illustrating the relationship between the applied voltage and the surface potential) at the position can be displayed.

Hereinafter, examples of the present invention will be described. The present invention is not limited to the examples.

EXAMPLE 1

In Example 1, a measuring method using the Kelvin probe force microscope based on the frequency shift detecting method will be described.

In this example, a probe device used for the probe microscope was formed as follows.

A commercially available cantilever for atomic force microscope without a probe (produced by NanoWorld AG, product name: TL-FM, spring constant: 3 N/m, resonance frequency: 75 kHz) was used as the cantilever.

A PMMA particle which was used for a probe device and had a diameter of 10 μm was bonded and fixed to the cantilever by a small amount of epoxy (produced by Gatan Inc., product name: G-1 Epoxy).

After that, a coating film which was made of Au and had a thickness of 50 nm was formed on the particle and each surface of the cantilever by a sputtering method.

Therefore, the probe device having the structure as illustrated in FIG. 2 was produced.

Figure 6:
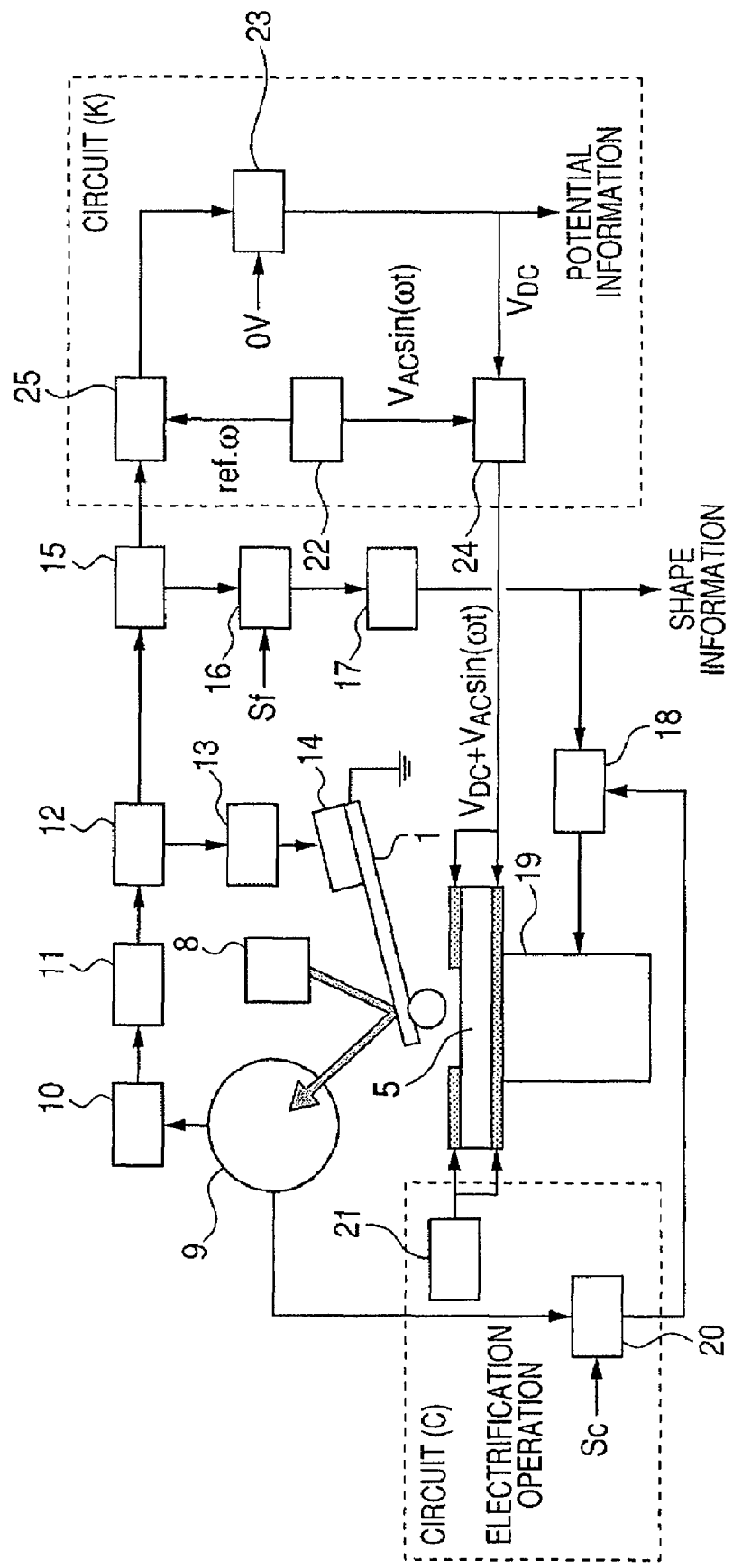
FIG. 6 is a schematic structural diagram illustrating a control circuit of the probe microscope which is used for measurement in the embodiment of the present invention.

FIG. 6 is a schematic structural diagram illustrating a control circuit of the probe microscope which is used in this example.

As illustrated in FIG. 6, the control circuit of a scanning probe microscope according to this example roughly includes three parts, that is, a circuit (C), a circuit (K) and a normal control circuit other than the circuits.

The circuit (C) is used for electrification operation and includes an error amplifier 20 and a DC power supply 21.

The circuit (K) is used for potential measurement and includes an oscillator 22, an error amplifier 23, an accumulator 24, and a lock-in amplifier 25.

The normal control circuit other than the circuit (C) and the circuit (K) is used for an atomic force microscope based on the frequency shift detecting method.

The normal control circuit includes a semiconductor laser 8, an optical displacement detector 9, a preamplifier 10, a phase shifter 11, a waveform converter 12, an attenuator 13, a piezoelectric vibrator 14, an FM demodulator 15, an error amplifier 16, a filter 17, a Z-piezoelectric driver 18, and a PZT scanner 19.

The respective circuits are controlled by a mechanism for performing time series switching at measurement timings (not shown).

Laser light having a wavelength of 670 nm which is emitted from the semiconductor laser 8 is reflected by the rear surface of the cantilever 1 and detected by the optical displacement detector 9 (position sensitive detector using four-part photodiode).

A signal from the optical displacement detector 9 is returned to the piezoelectric vibrator 14 fixed to the rear surface of the cantilever 1 through the preamplifier 10, the phase shifter 11, the waveform converter 12, and the attenuator 13.

The normal control circuit is a self-oscillation circuit using a positive feedback oscillation loop.

An output terminal of the waveform converter 12 is connected with the FM demodulator 15. A reduction in vibration frequency of the cantilever 1 is detected by the FM demodulator 15. A signal from the FM demodulator 15 is compared with a set value signal (Sf) by the error amplifier 16. Then, the feedback is performed so as to adjust the amount of attenuation of frequency shift to a constant amount.

In other words, an output of the error amplifier 16 is sent to the PZT scanner 19 which holds a sample 5 through the filter 17 and the Z-piezoelectric driver 18. The Z-piezoelectric driver is adjusted such that the distance between the sample and the probe becomes a set value.

At this time, when the sample is scanned in-plane (x, y), a shape image can be obtained based on an output signal from the filter 17.

When the measurement is to be performed in this example, the normal control circuit is first operated. Therefore, while the distance between the sample and probe is controlled, the surface of the sample is observed and a measurement region is determined.

Next, in-plane (x, y) scanning is stopped in the measurement region and a voltage value applied to the Z-piezoelectric element is stored. Then, the excitation of the cantilever is stopped (timing illustrated in (b) of FIG. 4).

After the stop of the excitation, the circuit (C) is selected to adjust the Z-control system, thereby bringing the tip end of the probe into contact with the surface of the sample.

At this time, an output of the optical displacement detector 9 is inputted to the error amplifier 20. The error amplifier 20 outputs a difference with a set value (Sc) to the Z-piezoelectric driver 18.

The contact pressure between the probe and the sample can be adjusted based on the set value (Sc). In this case, a force of 10 nN was set in view of the spring constant of the cantilever 1.

After the contact is established, the sample bias was applied from the DC power supply 21 to induce electrification on the surface of the sample (timing illustrated in (a) of FIG. 4). In this measurement, the probe device was grounded.

Next, the voltage value applied to the Z-piezoelectric element is returned to the previously stored voltage value to separate the tip end of the probe from the sample. Then, the excitation of the cantilever and the feedback control are restarted (timing illustrated in (b) of FIG. 4). At this time, an output of the DC power supply 21 is stopped and the circuit (K) is selected.

In the circuit (K), an alternating current component ($V_{AC} \sin(\omega t)$) which is an output of the oscillator 22 and a direct current component ($V_{DC}$) which is an output of the error amplifier 23 are combined to each other by the accumulator 24 and a resultant component is applied to the sample 5. Of the output of the optical displacement detector 9 which detects the vibration of the cantilever 1, a component of the frequency $\omega$ is extracted by the lock-in amplifier 25 and inputted to the error amplifier 23.

The principle of the Kelvin probe force microscope is based on a method of adjusting the direct current component ($V_{DC}$) such that the component of the frequency $\omega$ becomes 0. The direct current component ($V_{DC}$) corresponds to the surface potential of the sample.

When each surface potential is measured at the timing illustrated in (b1) of FIG. 5 while the sample bias applied at the timing illustrated in (a) of FIG. 5 is sequentially changed, the electronic state density of the surface of the sample can be obtained.

For example, an island-like pentacene thin film formed on a Si wafer was used as the sample 5. An Au thin film having an inside diameter of 0.5 mm and a thickness of 100 nm was formed by evaporation as the toroidal metal evaporation film 6.

Figure 8:
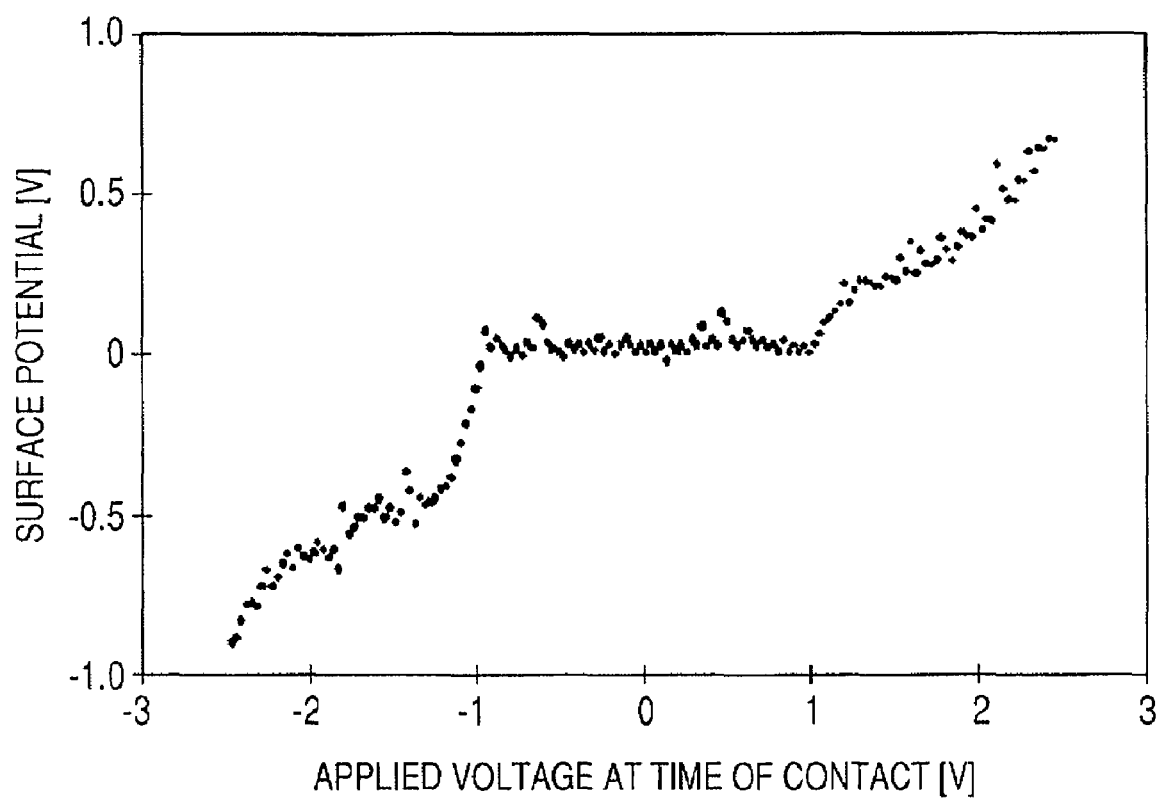
FIG. 8 is a graph illustrating a correlation relationship between a voltage applied at the time of contact and a surface potential as a result of measuring an electronic state density of a sample surface in Example 1 of the present invention.

FIG. 8 illustrates a result obtained by measurement in the above-mentioned condition. The result can be confirmed more clearly by differentiating an electrification potential with respect to the applied bias. However, FIG. 8 shows a region in which the electrification potential is 0 at the vicinity of V=0 and thus it is apparent that the region corresponds to the energy gap.

EXAMPLE 2

In Example 2, a measuring method using the Kelvin probe force microscope based on the amplitude shift detecting method will be described.

In this example, a probe device used for the probe microscope was the probe device having the same structure as that used in Example 1 as illustrated in FIG. 2.

Figure 7:
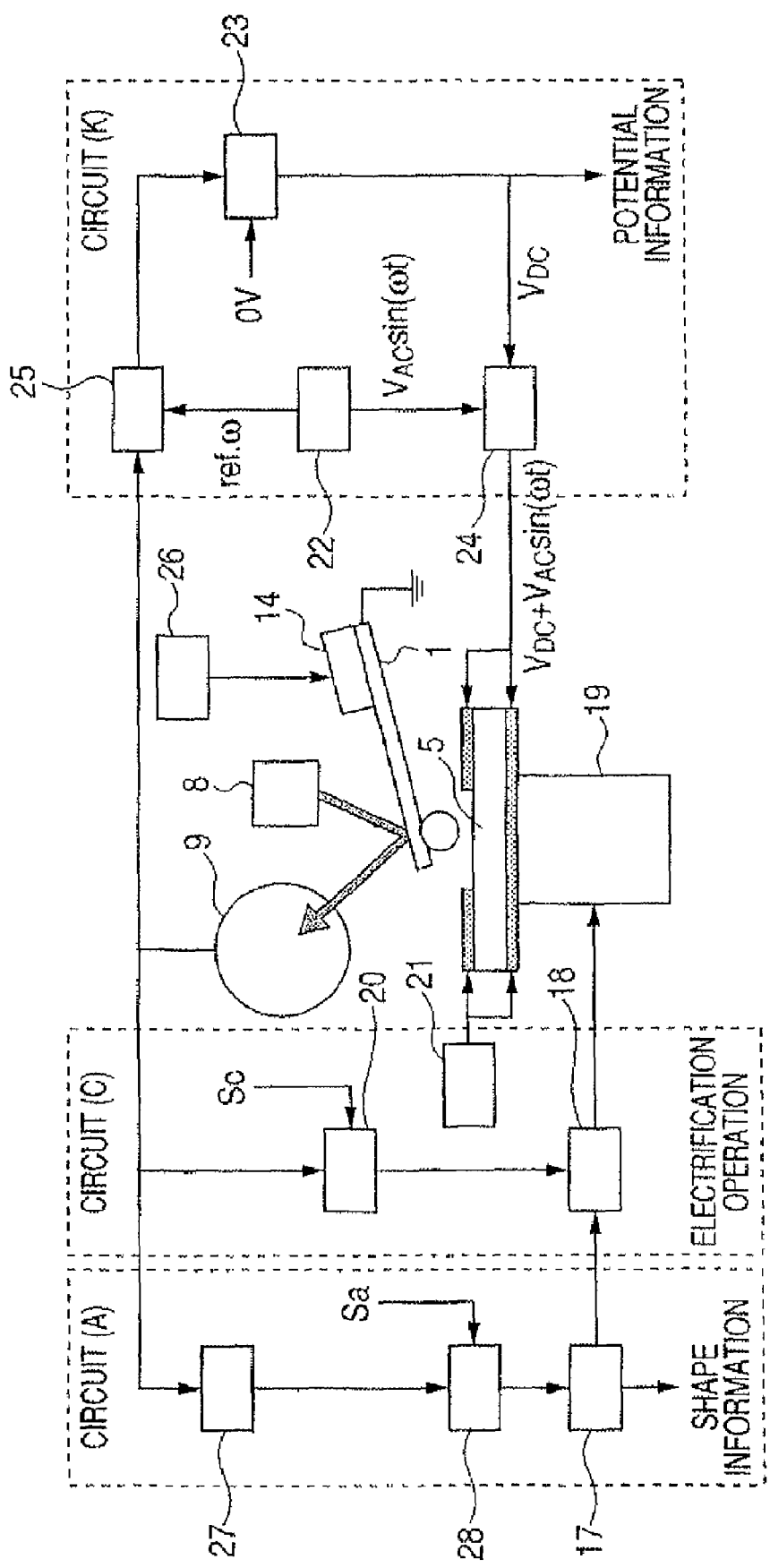
FIG. 7 is a schematic structural diagram illustrating a control circuit of a probe microscope which is used for measurement in Example 2 of the present invention.

FIG. 7 is a schematic structural diagram illustrating a control circuit of the scanning probe microscope which is used in this example.

As illustrated in FIG. 7, the control circuit of a scanning probe microscope according to this example roughly includes four parts, that is, a circuit (C), a circuit (K), a circuit (A), and a normal control circuit other than the circuits.

The circuit (C) is used for electrification operation and includes a Z-piezoelectric driver 18, an error amplifier 20, and a DC power supply 21.

The circuit (K) is used for potential measurement and includes an oscillator 22, an error amplifier 23, an accumulator 24, and a lock-in amplifier 25.

The circuit (A) is used for obtaining shape information and includes a filter 17, an RMS-DC converter 27, and an error amplifier 28.

The normal control circuit other than the circuit (C), the circuit (K), and the circuit (A) is used for an atomic force microscope based on the frequency shift detecting method.

The normal control circuit includes a semiconductor laser 8, an optical displacement detector 9, a piezoelectric vibrator 14, a PZT scanner 19, and an oscillator 26.

The respective circuits are controlled by a mechanism for performing time series switching at measurement timings (not shown).

Laser light having a wavelength of 670 nm which is emitted from the semiconductor laser 8 is reflected by the rear surface of the cantilever 1 and detected by the optical displacement detector 9 (position sensitive detector using four-part photodiode).

In the circuit (A), a signal from the optical displacement detector 9 is inputted to the error amplifier 28 through the RMS-DC converter 27. The signal is compared with a set value signal (Sa) by the error amplifier 28. Then, the feedback is performed so as to adjust the amount of attenuation of vibration amplitude to a constant amount.

In other words, an output of the error amplifier 28 is sent to the PZT scanner 19 which holds a sample 5 through the filter 17 and the Z-piezoelectric driver 18. The Z-piezoelectric driver is adjusted such that the distance between the sample and the probe becomes a set value.

At this time, when the sample is scanned in-plane (x, y), a shape image can be obtained based on an output signal from the filter 17.

When the measurement is to be performed in Example 2, the normal control circuit is first operated. Therefore, while the distance between the sample and probe is controlled, the surface of the sample is observed and a measurement region is determined.

Next, in-plane (x, y) scanning is stopped in the measurement region and a voltage value applied to the Z-piezoelectric driver is stored. Then, the excitation of the cantilever is stopped (timing illustrated in (b2) of FIG. 5).

After the stop of the excitation, the circuit (C) is selected to adjust the Z-control system, thereby bringing the tip end of the probe into contact with the surface of the sample.

At this time, an output of the optical displacement detector 9 is inputted to the error amplifier 20. The error amplifier 20 outputs a difference with a set value (Sc) to the Z-piezoelectric driver 18. The contact pressure between the probe and the sample can be adjusted based on the set value (Sc). In this case, a force of 10 nN was set in view of the spring constant of the cantilever 1.

After the contact is established, the sample bias was applied from the DC power supply 21 to induce electrification on the surface of the sample (timing illustrated in (a) of FIG. 5). In this measurement, the probe device was grounded.

Next, a value obtained by adding an offset value to the previously stored applied voltage value to the Z-piezoelectric element is returned to the PZT scanner 19 to separate the tip end of the probe from the sample. Then, the excitation of the cantilever is restarted (timing illustrated in (b1) of FIG. 5). The offset value is desirably a value for setting the distance between the sample and the probe to approximately 15 nm.

At this time, the output of the DC power supply 21 is stopped and the circuit (K) is selected.

In the circuit (K), an alternating current component ($V_{AC} \sin(\omega t)$) which is an output of the oscillator 22 and a direct current component ($V_{DC}$) which is an output of the error amplifier 23 are combined to each other by the accumulator 24 and a resultant component is applied to the sample 5. Of the output of the optical displacement detector 9 which detects the vibration of the cantilever 1, a component of the frequency $\omega$ is extracted by the lock-in amplifier 25 and inputted to the error amplifier 23.

The principle of the Kelvin probe force microscope is based on a method of adjusting the direct current component ($V_{DC}$) such that the component of the frequency $\omega$ becomes 0. The direct current component ($V_{DC}$) corresponds to the surface potential of the sample.

After the potential measurement, the feedback control restarts, so the Z-piezoelectric driver is adjusted such that the distance between the sample and the probe becomes the set value. Then, next measurement is performed.

Herein, when each surface potential is measured at the timing illustrated in (b1) of FIG. 5 while the sample bias applied at the timing illustrated in (a) of FIG. 5 is sequentially changed, the electronic state density of the surface of the sample can be obtained.

In this method, it is determined that the same data as that in Example 1 can be obtained. Note that, when the offset value is increased and thus the distance between the sample and the probe becomes too long, measurement precision reduces. Therefore, it is necessary to set a suitable offset value.

EXAMPLE 3

In Example 3, a scanning probe microscope provided with the scanning function, which is configured to obtain an electronic state density distribution image, will be described.

The scanning probe microscope according to this example included the same control circuit as that in Example 1.

Therefore, when the in-plane scanning function of the scanning probe microscope is used, the measurement of the electronic state density as described in Example 1 can be sequentially performed while the position on the surface of the sample is changed. In view of the fact that each region of the surface of the sample is measured in this example, the measurement is based on the same idea as that in the current imaging tunneling spectroscopy (CITS) measurement in which I-V measurement is performed on each region of the surface of the sample.

However, according to the measuring method in this example, when the relationship between the applied voltage and the surface potential is to be obtained as measurement data at each position, the number of distributions of the surface potential which can be obtained corresponding to the applied voltage becomes equal to the number of voltages applied for measurement.

In the case where a sample of the same island-like pentacene thin film formed on the Si wafer as that of Example 1 is measured by the scanning probe microscope of this example, when the probe contact potential is selected as appropriate, a pentacene island having the same electronic state can be distinguished from a substrate exposure portion.

The measuring method according to this example can be executed using the circuit described in Example 2.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-129859, filed May 9, 2006, which is hereby incorporated by reference herein in its entirety.

What is claimed is:

1. A probe microscope comprising:
an electroconductive probe device;
a contact electrification mechanism for bringing the electroconductive probe device into contact with a surface of a sample and applying a voltage between the electroconductive probe device and the sample to induce electrification on the surface of the sample;
a potential measuring mechanism for bringing the electroconductive probe device close to the surface of the sample in a non-contact state to measure a surface potential of the sample,
wherein the electrification of the surface of the sample by the contact electrification mechanism and the measurement of the surface potential by the potential measuring mechanism alternate at a predetermined period while the voltage applied between the electroconductive probe device and the sample at a time of the contact is sequentially changed on a per-cycle basis; and
a probe device control mechanism for controlling the electroconductive probe device, wherein the probe device control mechanism comprises a displacement detection unit for detecting movement of the probe device, and an interval control unit for controlling a distance between a tip end of the probe device and the surface of the sample based on the movement of the probe, and
wherein the interval control unit comprises a control system using a frequency shift detecting method.

2. A probe microscope comprising:
an electroconductive probe device;
a contact electrification mechanism for bringing the electroconductive probe device into contact with a surface of a sample and applying a voltage between the electroconductive probe device and the sample to induce electrification on the surface of the sample;
a potential measuring mechanism for bringing the electroconductive probe device close to the surface of the sample in a non-contact state to measure a surface potential of the sample,
wherein the electrification of the surface of the sample by the contact electrification mechanism and the measurement of the surface potential by the potential measuring mechanism alternate at a predetermined period while the voltage applied between the electroconductive probe device and the sample at a time of the contact is sequentially changed on a per-cycle basis; and
a probe device control mechanism for controlling the electroconductive probe device, wherein the probe device control mechanism comprises a displacement detection unit for detecting movement of the probe device, and an interval control unit for controlling a distance between a tip end of the probe device and the surface of the sample based on the movement of the probe, and
wherein the interval control unit comprises a control system using an amplitude shift detecting method.

3. A method of measuring a surface potential of a sample by a probe microscope, comprising:
bringing an electroconductive probe device into contact with a surface of the sample and applying a voltage between the electroconductive probe device and the sample to induce electrification on the surface of the sample;
bringing the electroconductive probe device close to the surface of the sample to measure the surface potential of the sample,
wherein while the voltage applied at a time of the contact is sequentially changed on a per-cycle basis, the induction of the electrification on the surface of the sample and the measurement of the surface potential of the sample alternate at a predetermined period to determine a correlation between the voltage applied at the time of the contact and the surface potential of the sample; and
determining the electronic state density on the surface of the sample by assuming that the measured correlation between the voltage applied at the time of the contact and the surface potential of the sample is related to a correlation between an electron energy and an electronic state density on the surface of the sample.

* * * * *